(12) United States Patent
Koshiba et al.

(10) Patent No.: US 11,799,341 B2
(45) Date of Patent: Oct. 24, 2023

(54) STATOR AND ROTARY ELECTRIC MACHINE

(71) Applicant: Komatsu Ltd., Tokyo (JP)

(72) Inventors: Atsuyoshi Koshiba, Tokyo (JP);
Takaaki Kimura, Tokyo (JP); Kousuke Mikami, Tokyo (JP); Teiichirou Chiba, Tokyo (JP)

(73) Assignee: Komatsu Ltd., Tokyo (JP)

( * ) Notice: Subject to any disclaimer, the term of this patent is extended or adjusted under 35 U.S.C. 154(b) by 464 days.

(21) Appl. No.: 17/274,335

(22) PCT Filed: Aug. 16, 2019

(86) PCT No.: PCT/JP2019/032148
§ 371 (c)(1),
(2) Date: Mar. 8, 2021

(87) PCT Pub. No.: WO2020/066358
PCT Pub. Date: Apr. 2, 2020

(65) Prior Publication Data
US 2021/0336502 A1   Oct. 28, 2021

(30) Foreign Application Priority Data

Sep. 28, 2018  (JP) .................. 2018-184221

(51) Int. Cl.
*H02K 3/12* (2006.01)
*H02K 3/28* (2006.01)
*H02K 3/50* (2006.01)

(52) U.S. Cl.
CPC ................ *H02K 3/12* (2013.01); *H02K 3/28* (2013.01); *H02K 3/50* (2013.01); *H02K 2213/03* (2013.01)

(58) Field of Classification Search
CPC .............. H02K 3/12; H02K 3/28; H02K 3/50
See application file for complete search history.

(56) References Cited

U.S. PATENT DOCUMENTS

| 10,044,236 | B2* | 8/2018 | Tamura | .................. H02K 3/30 |
| 2009/0212654 | A1* | 8/2009 | Kaneiwa | .................. H02K 3/50 310/214 |

(Continued)

FOREIGN PATENT DOCUMENTS

| JP | 2016152751 | 8/2016 |
| JP | 2017034847 | 2/2017 |

(Continued)

OTHER PUBLICATIONS

JP-2017112749-A_translate (Year: 2017).*

*Primary Examiner* — Tulsidas C Patel
*Assistant Examiner* — Mohammed Ahmed Qureshi
(74) *Attorney, Agent, or Firm* — Fish & Richardson P.C.

(57) ABSTRACT

A stator includes a stator core including a plurality of teeth and a plurality of slots, a coil wound around the plurality of slots, and a spacer disposed on an end portion in an axial direction of the stator core. The coil includes a plurality of coil segments, each including a bent portion and a pair of legs. The spacer includes a coil support portion that is disposed between an end portion of each of the teeth and the bent portion of the coil segment and that has a support surface. A distance from the end portion of each of the teeth to the support surface on an inner side in a radial direction of the stator core is longer than a distance from the end portion of each of the teeth to the support surface on an outer side in the radial direction of the stator core.

8 Claims, 14 Drawing Sheets

(56) References Cited

U.S. PATENT DOCUMENTS

| | | |
|---|---|---|
| 2012/0007460 A1 | 1/2012 | Kitamura et al. |
| 2016/0248290 A1 | 8/2016 | Tamura |
| 2017/0033619 A1 | 2/2017 | Tamura |
| 2018/0166931 A1* | 6/2018 | Takahashi ............ H02K 15/085 |

FOREIGN PATENT DOCUMENTS

| | | |
|---|---|---|
| JP | 2017112749 A * | 6/2017 |
| JP | 2017184559 | 10/2017 |
| JP | 2018098864 | 6/2018 |
| WO | WO2011155061 | 12/2011 |

* cited by examiner

STATOR AND ROTARY ELECTRIC MACHINE

CROSS-REFERENCE TO RELATED APPLICATIONS

This application is a National Stage application under 35 U.S.C. § 371 of International Application No. PCT/JP2019/032148, filed on Aug. 16, 2019, which claims priority to Japanese Patent Application No. 2018-184221, filed on Sep. 28, 2018. The contents of the prior applications are incorporated herein in their entirety.

TECHNICAL FIELD

The present invention relates to a stator and a rotary electric machine.

BACKGROUND ART

There is a stator of a rotary electric machine, in which a coil is wound around a stator core in wave form. In this type of stator, the coil includes a plurality of coil segments made of a rectangular wire. Each of the coil segments includes a bent portion formed by bending a middle portion in a longitudinal direction of the rectangular wire at a predetermined angle, and a pair of legs extending parallel to each other from both ends of the bent portion.

In this type of stator, a wave winding coil can be produced by inserting the pair of legs of each of the coil segments into a pair of slots of the stator core from one end portion side in an axial direction of the stator core, and then bending tip portions of the legs of the coil segments and welding the tip portions of the legs of two coil segments which are separate, the tip portions protruding from the other end portion side of the stator core. When the legs of the coil segments are bent or when the legs of the coil segments are welded together, the tips of the bent portions which protrude from the one end portion of the stator core are required to be pressed toward the one end portion of the stator core to be fixed such that the coil segments do not move with respect to the stator core in the axial direction.

Patent Literature 1 discloses that the bending angles of the bent portions of the coil segments formed by molding using molds are within a predetermined range between the plurality of coil segments. Since the bending angles of the bent portions of the plurality of coil segments are within the predetermined range, the number of the molds used to form the bent portion (to bend the middle portion of the rectangular wire) can be reduced.

CITATION LIST

Patent Literature

Patent Literature 1
Japanese Unexamined Patent Application, First Publication No. 2017-184559

SUMMARY OF INVENTION

Technical Problem

In this type of stator, the plurality of coil segments are arranged in a radial direction of the stator core. Namely, since the plurality of slots are arranged in a circumferential direction of the stator core, the interval between the pair of slots into which the pair of legs of the same coil segment are inserted is increased as the slots extend outward in the radial direction of the stator core. For this reason, when the bending angles of the bent portions of the plurality of coil segments are within the predetermined range, the protruding heights of the bent portions protruding from the one end portion of the stator core in the axial direction of the stator core are increased as an outer side in the radial direction of the stator core is approached. If the protruding height of the bent portion differs between the plurality of coil segments, when the coil segments are welded together, it is difficult to evenly press the bent portions of the plurality of coil segments to the one end portion of the stator core to fix the bent portions. When the coil segments are bent or when the coil segments are welded together, the above configuration leads to the movement in the axial direction of the coil segments, and thus there occurs an imbalance in height between the legs to be welded together. For this reason, the imbalance causes welding defects and an increase in the number of production processes.

The present invention has been made in view of such problems, and an object of the present invention is to provide a stator capable of suppressing a difference in axial height between legs to be welded together, and a rotary electric machine including the same.

Solution to Problem

According to one aspect of the present invention, a stator is provided including: a stator core including a plurality of teeth and a plurality of slots that are alternately formed in a circumferential direction; a coil wound around the plurality of slots; and a spacer disposed on an end portion in an axial direction of the stator core. The coil includes a plurality of coil segments, each including a bent portion bent at a predetermined angle and a pair of legs that extend parallel to each other from both ends of the bent portion to be inserted into the slots.

The spacer includes a coil support portion that is disposed between an end portion of each of the teeth and the bent portion of the coil segment in the axial direction and that has a support surface which supports the bent portion in the axial direction. A distance from the end portion of each of the teeth to the support surface on an inner side in a radial direction of the stator core is longer than a distance from the end portion of each of the teeth to the support surface on an outer side in the radial direction of the stator core.

According to one aspect of the present invention, a rotary electric machine is provided including a rotor and the stator.

Advantageous Effects of Invention

According to the present invention, even when the bending angles of the bent portions of the plurality of coil segments are within a predetermined range, a variation between the axial heights of the legs to be welded together can be suppressed.

DESCRIPTION OF EMBODIMENTS

Hereinafter, one embodiment of the present invention will be described in detail with reference to FIGS. 1 to 10.

<Rotary Electric Machine>

Figure 1:
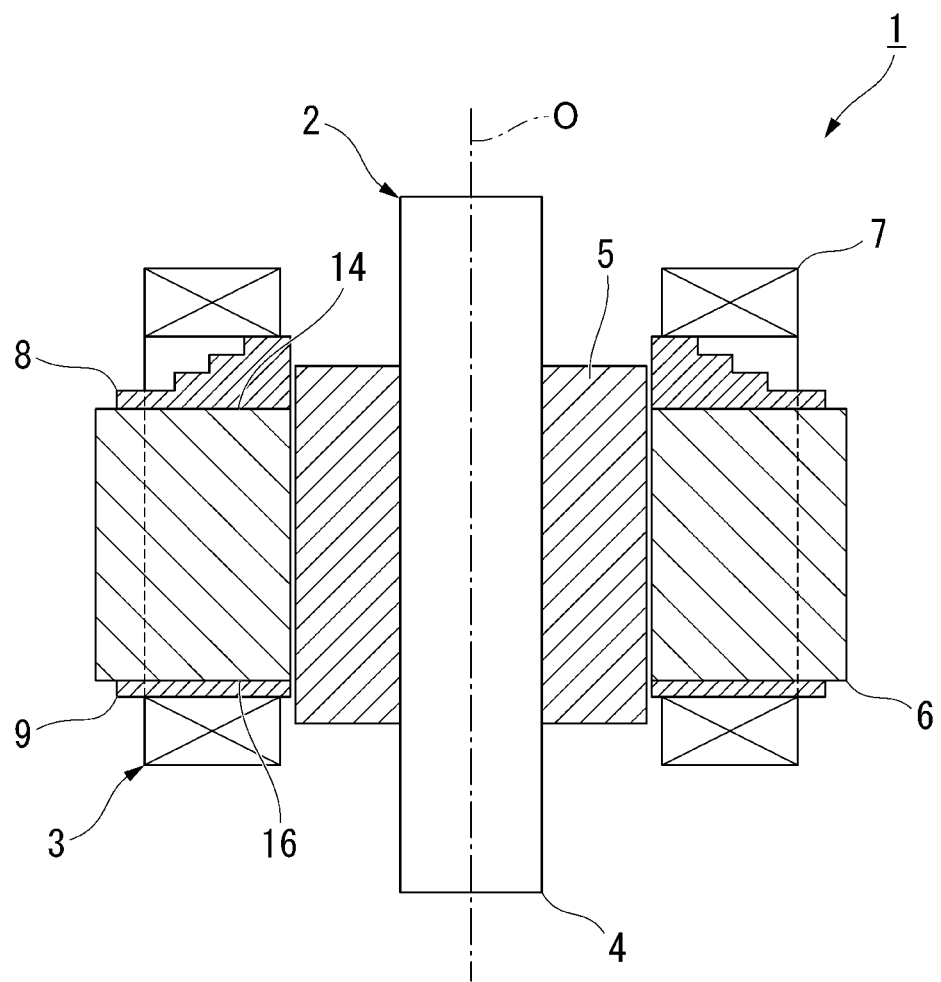
FIG. 1 is a cross-sectional view illustrating a rotary electric machine according to one embodiment of the present invention.

A rotary electric machine 1 illustrated in FIG. 1 is, for example, a three-phase (U-phase, V-phase, and W-phase) alternating permanent magnet synchronous motor that drives an upper swing body to swing with respect to an undercarriage in a construction machine (unillustrated). The rotary electric machine 1 includes a rotor 2 and a stator 3.

The rotor 2 includes a rotor shaft 4 and a rotor core 5. The rotor shaft 4 is a rod-shaped member centered on an axis O. The rotor shaft 4 is provided so as to be rotatable around the axis O. The rotor core 5 is formed in a cylindrical shape centered on the axis O. The rotor core 5 is fixed to an outer peripheral surface of the rotor shaft 4.

<Stator>

Figure 2:
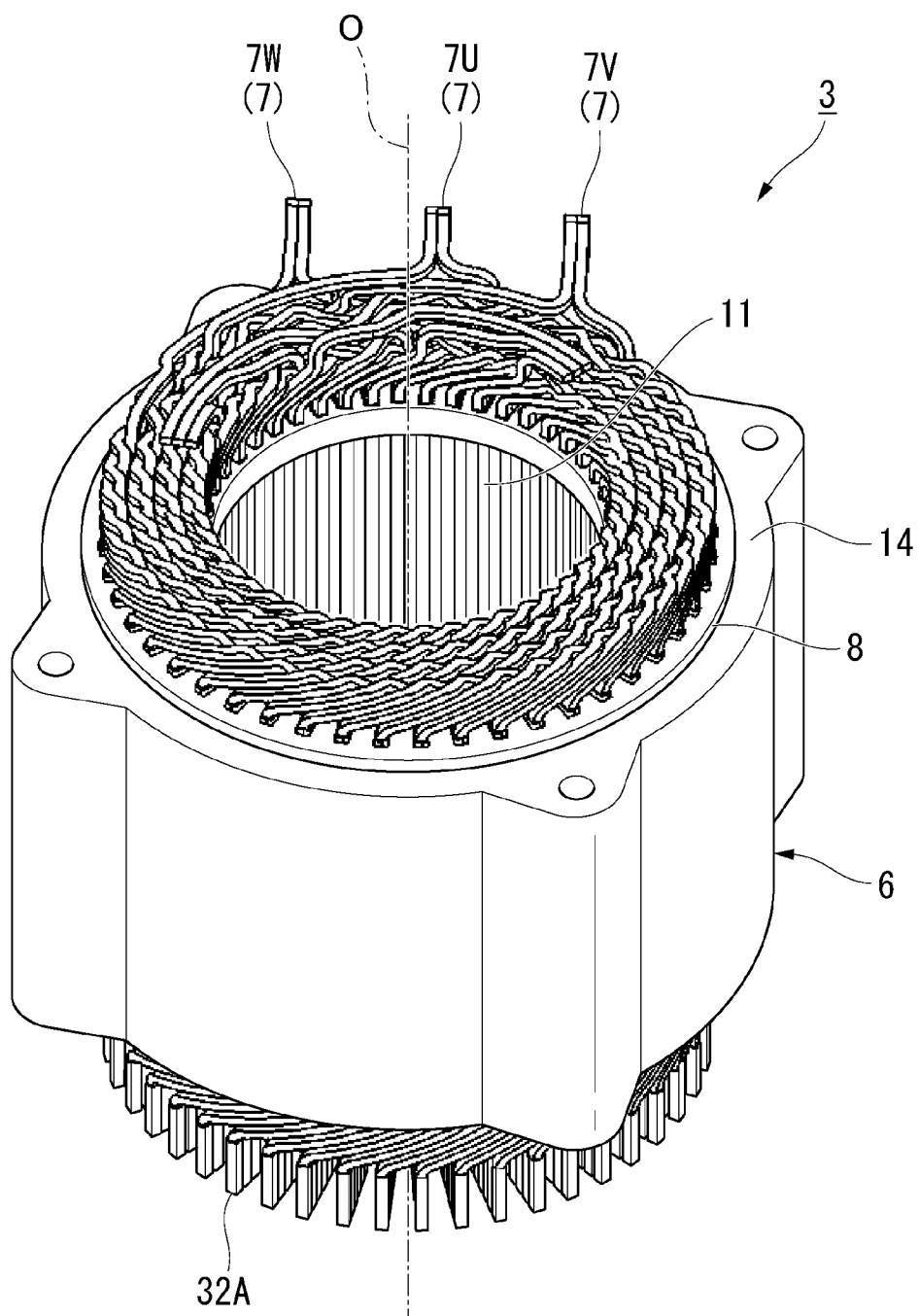
FIG. 2 is a perspective view illustrating a stator according to one embodiment of the present invention.

As illustrated in FIGS. 1 and 2, the stator 3 includes a stator core 6, a coil 7, and a spacer 8.

<Stator Core>

Figure 6:
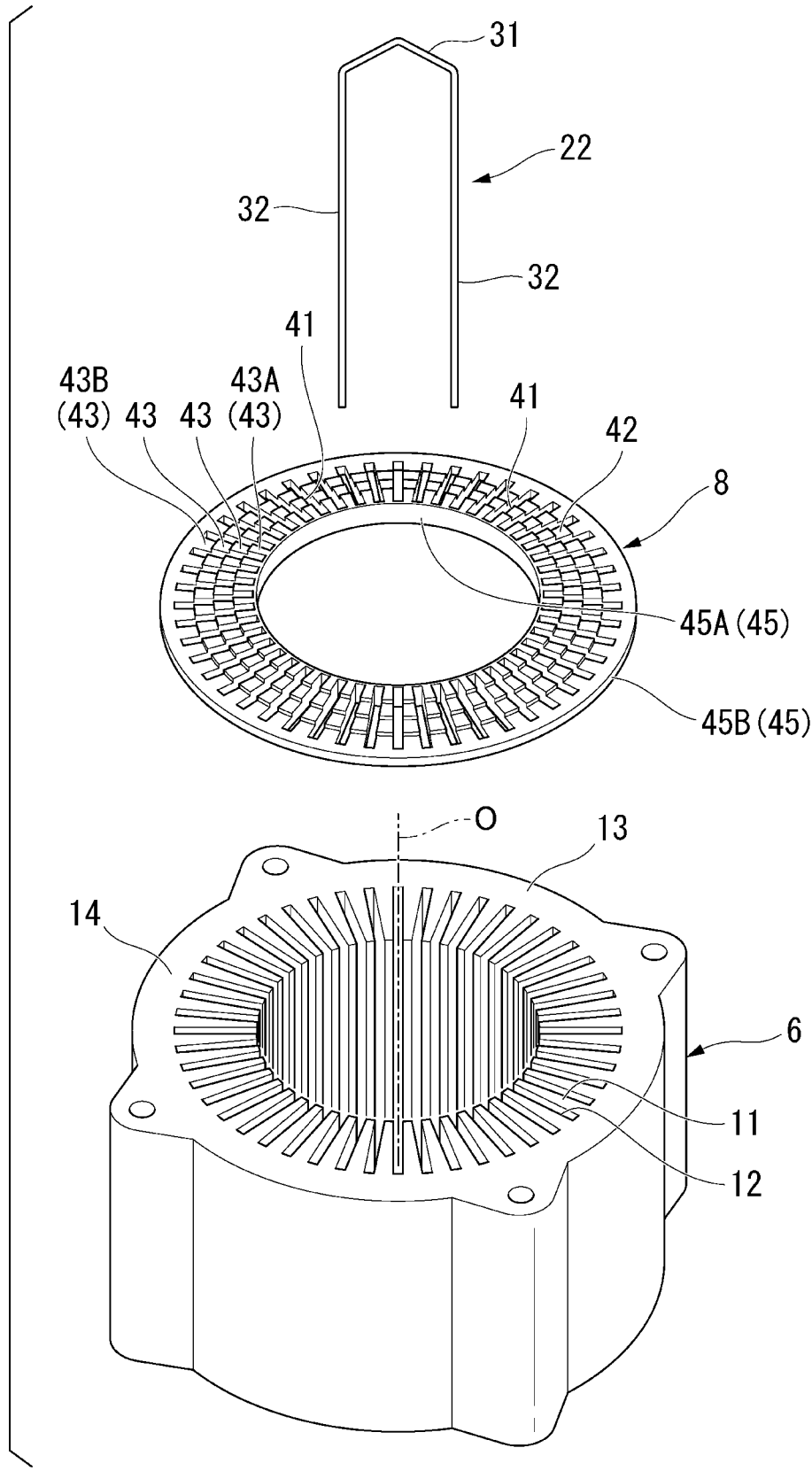
FIG. 6 is an exploded perspective view illustrating a state before a spacer and the main coil segment are attached to a stator core in the stator of FIG. 2.

As illustrated in FIGS. 1 and 6, the stator core 6 is formed in a cylindrical shape centered on the axis O. The rotor 2 described above is rotatably accommodated inside the stator core 6.

As illustrated in FIG. 6, the stator core 6 includes a plurality of teeth 11 and a plurality of slots 12.

The plurality of teeth 11 and the plurality of slots 12 are alternately formed in a circumferential direction of the stator core 6. The plurality of teeth 11 have the same shape and size. Each of the teeth 11 is formed such that the width thereof in the circumferential direction of the stator core 6 is decreased as each of the teeth 11 extends inward in a radial direction of the stator core 6. Accordingly, the width of each of the slots 12 in the circumferential direction of the stator core 6 is constant in the radial direction of the stator core 6. In addition, the interval between two slots 12 adjacent to each other in the circumferential direction of the stator core 6 is decreased as the slots 12 extend inward in the radial direction of the stator core 6. The plurality of slots 12 are arranged at equal intervals in the circumferential direction of the stator core 6.

In the rotary electric machine 1 of the present embodiment configured as a three-phase motor, the plurality of teeth 11 and slots 12 are alternately formed at equal intervals in the circumferential direction.

Figure 7:
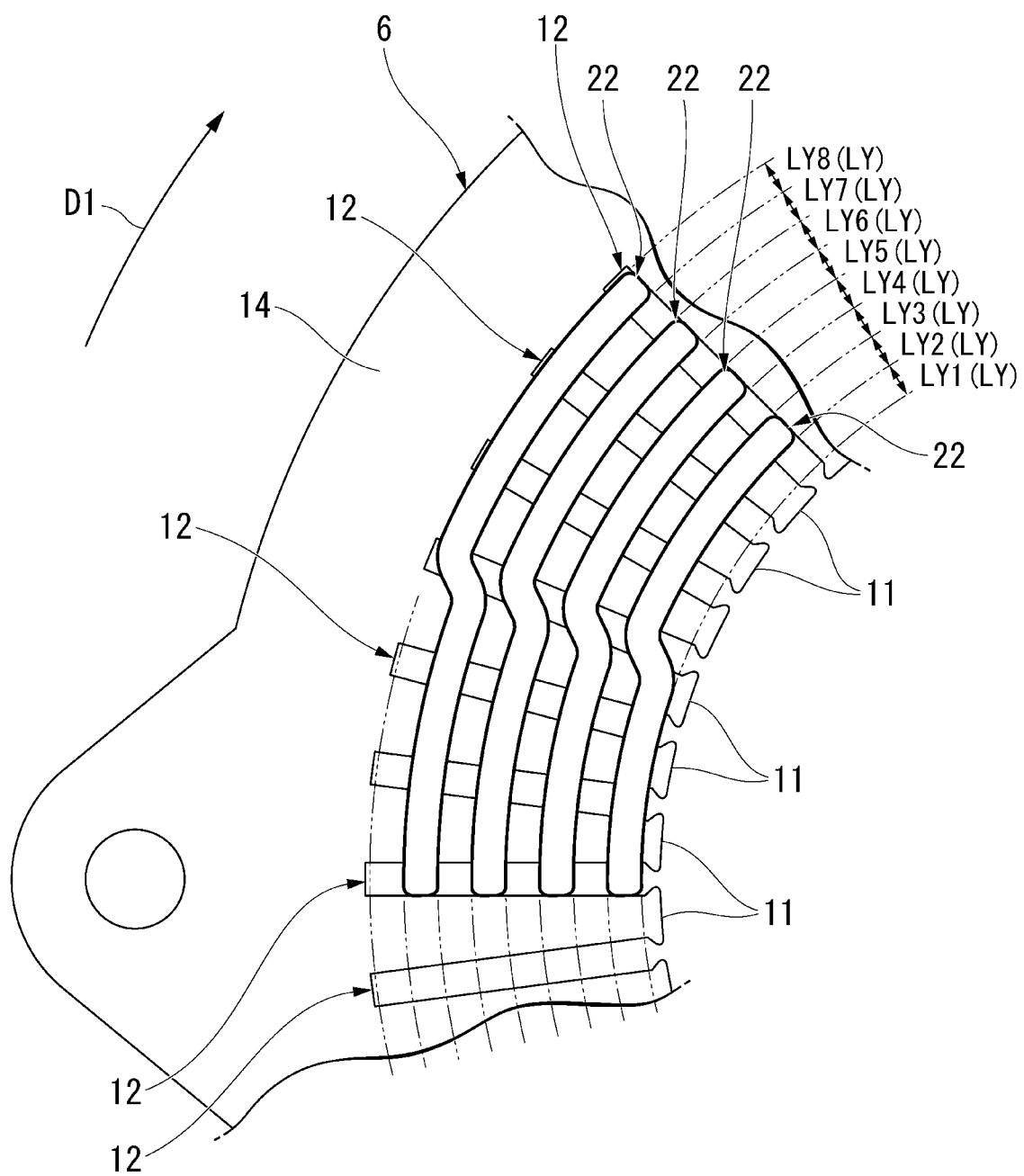
FIG. 7 is a plan view illustrating a main part of the stator core seen in an axial direction of the stator core in the stator of FIG. 2.
Figure 8:
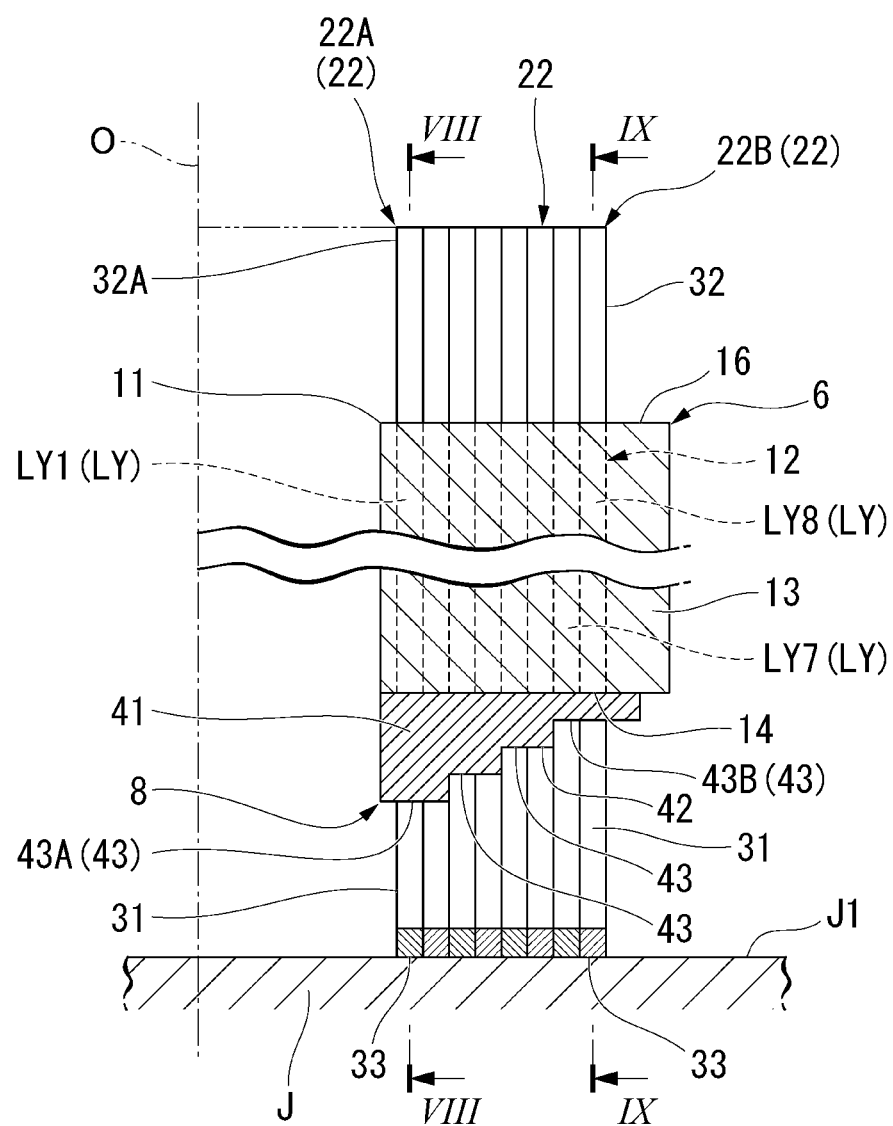
FIG. 8 is a cross-sectional view schematically illustrating a state after the spacer and the main coil segment are attached to the stator core in the stator of FIG. 2.
Figure 9:
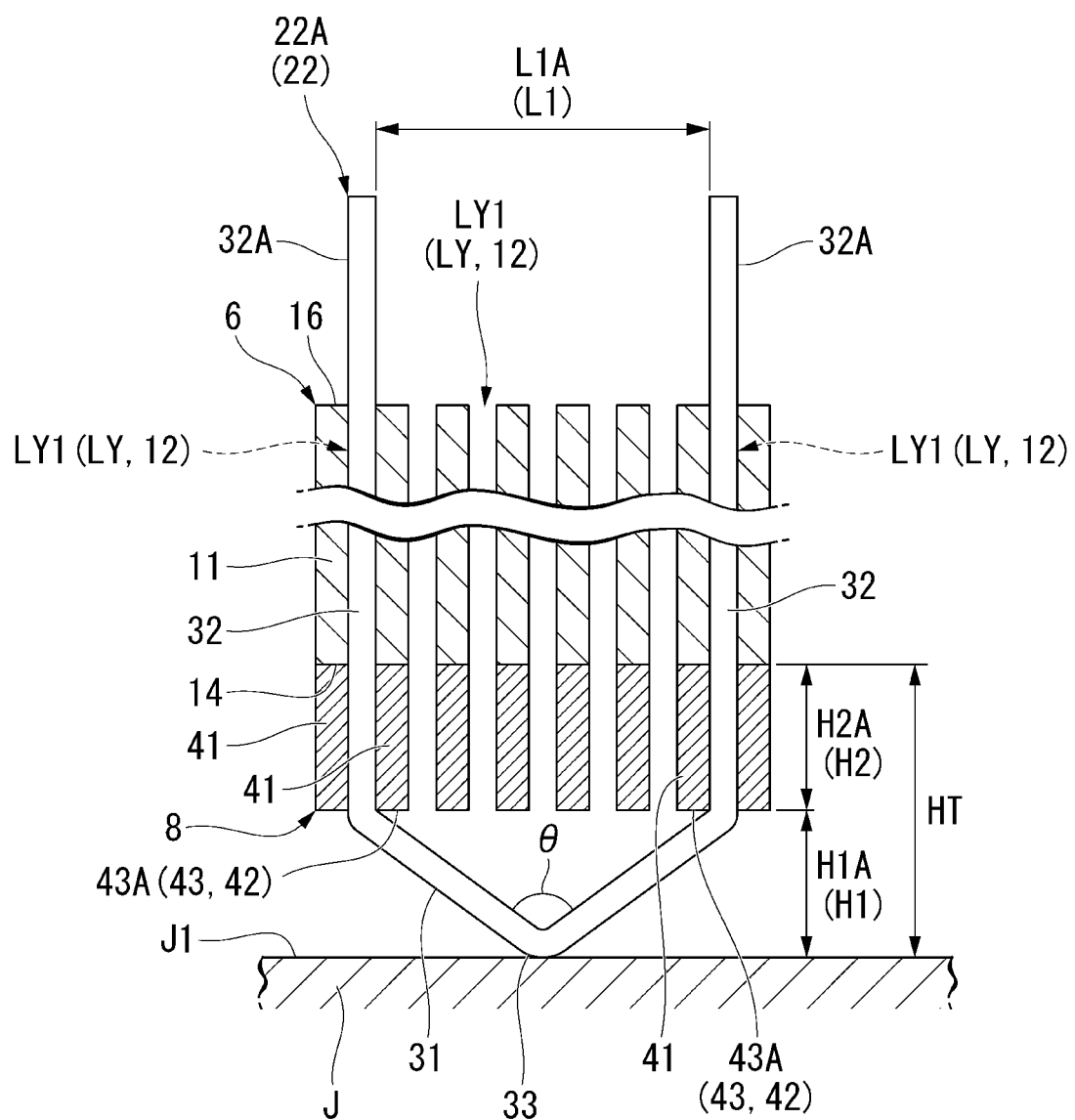
FIG. 9 is a cross-sectional view taken along line VIII-VIII of FIG. 8.
Figure 10:
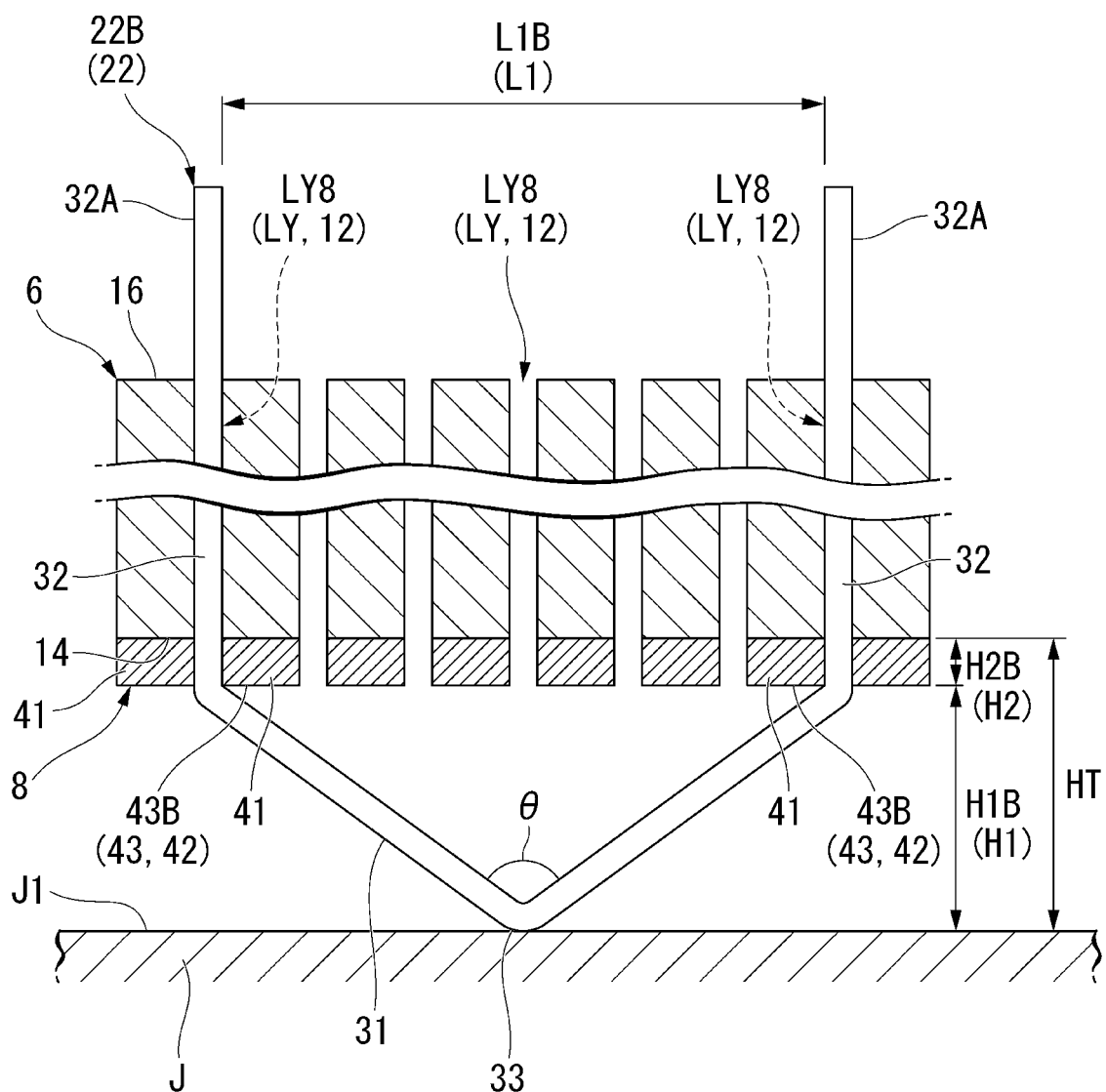
FIG. 10 is a cross-sectional view taken along line IX-IX of FIG. 8.

As illustrated in FIGS. 7 and 8, each of the slots 12 has a plurality of insertion regions LY arranged in the radial direction of the stator core 6. One leg 32 of a coil segment 22 to be described later is inserted into each of the insertion regions LY. Namely, in each of the slots 12, a plurality of the legs 32 are arranged in the radial direction of the stator core 6. In the present embodiment, eight insertion regions LY1 to LY8 are arranged in the radial direction of the stator core 6. In the following description, each of the insertion regions LY is referred to as a layer LY. Eight layers LY1 to LY8 arranged in the radial direction of the stator core 6 are a first layer LY1, a second layer LY2, . . . , and an eighth layer LY8 arranged in order from an inner side in the radial direction of the stator core 6. In the following description, the first layer LY1 located on an innermost side in the radial direction of the stator core 6 may be referred to as an innermost peripheral layer LY1, and the eighth layer LY8 located on an outermost side may be referred to as an outermost peripheral layer LY8. Incidentally, as illustrated in FIGS. 9 and 10, the interval between the slots 12 in the innermost peripheral layer LY1 is larger than the interval between the slots 12 in the outermost peripheral layer LY8.

As illustrated in FIG. 6, the stator core 6 further includes a yoke 13 that is formed in a cylindrical shape to integrally connect the plurality of teeth 11. The yoke 13 is connected to ends of the plurality of teeth 11, the ends being located on an outer side in the radial direction of the stator core 6.

The stator core 6 is formed, for example, by stacking a plurality of electromagnetic steel plates in an axis O direction. Incidentally, the stator core 6 may be formed by powder molding.

<Coil>

As illustrated in FIG. 2, the stator 3 of the present embodiment includes the coils 7 (7U, 7V, and 7W) of three phases. Each of the coils 7 is wound around the plurality of slots 12 in wave form at a predetermined pitch.

Figure 3:
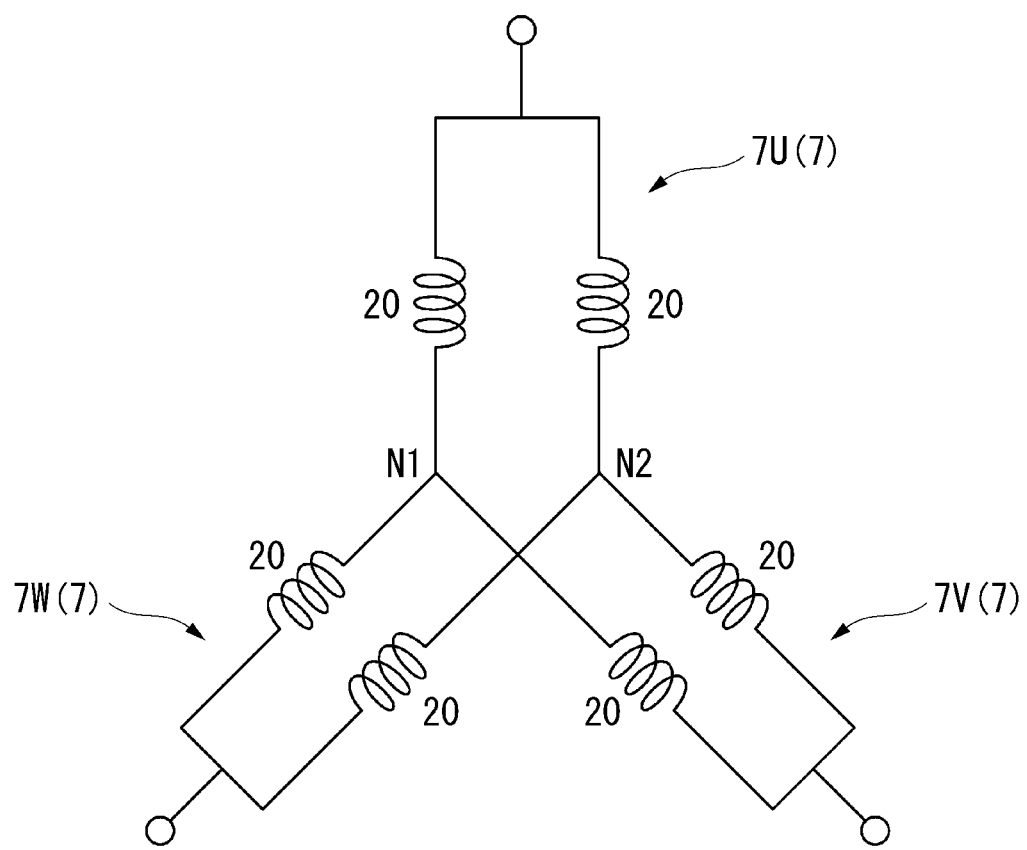
FIG. 3 is a circuit diagram illustrating a three-phase alternating circuit in the stator of FIG. 2.

As illustrated in FIG. 3, the coils 7U, 7V, and 7W of three phases form a three-phase alternating circuit. The coil 7 of each phase (U phase, V phase, and W phase) includes two parallel coils 20 connected in parallel. The three-phase alternating circuit adopts double star connection by which the coils 7 of three phases are connected at neutral points N1 and N2.

Figure 4:
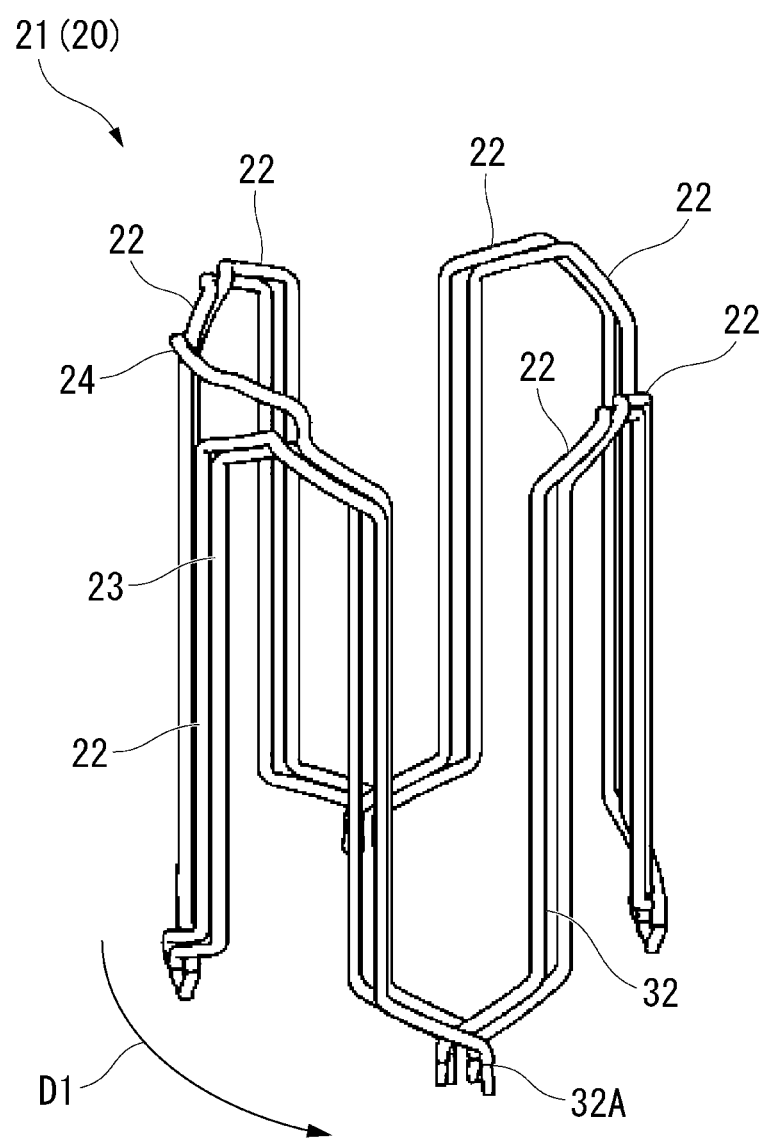
FIG. 4 is a perspective view illustrating part of a coil forming the stator of FIG. 2.

As illustrated in FIG. 4, the parallel coil 20 of each phase includes a plurality of main coil segments 22 as coil segments. In addition, the parallel coil 20 includes a sub-coil segment 23 and a transition coil segment 24 as coil segments.

Figure 5:
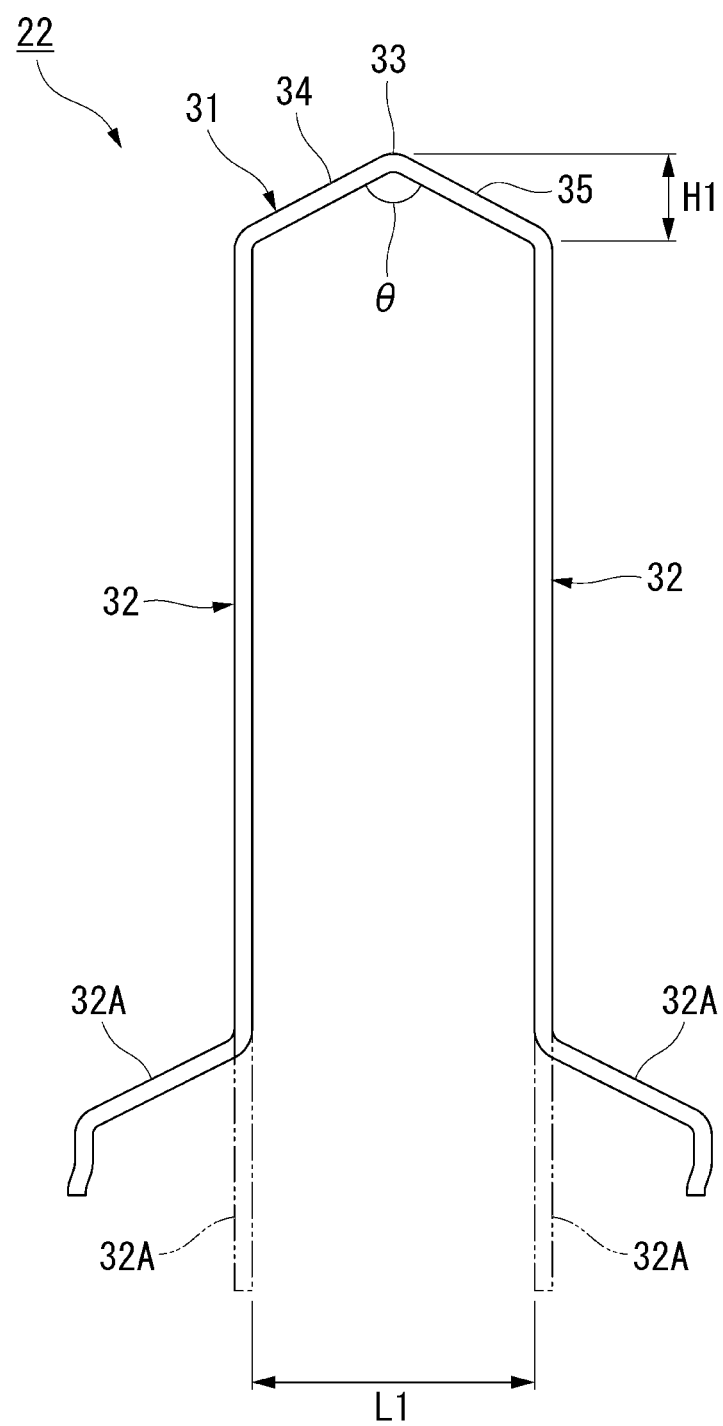
FIG. 5 is a front view illustrating a main coil segment forming the stator of FIG. 2.

As illustrated in FIG. 5, the main coil segment 22 is formed by bending a rectangular wire having a substantially quadrilateral cross section. The main coil segment 22 may be made of a round wire having a circular cross section. The main coil segment 22 includes a bent portion 31 bent at a predetermined bending angle θ, and a pair of the legs 32 extending parallel to each other from both ends of the bent portion 31. Incidentally, the bending angle θ may differ between the main coil segment 22 disposed on the inner side in the radial direction and the main coil segment 22 disposed on the outer side in the radial direction.

The bending angles θ of the bent portions 31 may be within a predetermined range between all the main coil segments 22 forming the parallel coil 20. This can reduce the number of molds that form the bent portion of the main coil segment.

In addition, the bent portion 31 is bent such that a first portion 34 and a second portion 35 of the bent portion 31, the first portion 34 and the second portion 35 being located on both sides of a top 33 of the bent portion 31 when seen in an extending direction of the legs 32, are located offset from each other in a direction corresponding to the radial direction of the stator core 6, in a state where the first portion 34 and the second portion 35 are inserted into the stator core 6. Accordingly, the first portion 34 and the second portion 35 of the bent portion 31 are located offset from each other in the radial direction of the stator core 6 to correspond to two layers LY adjacent to each other.

Tip portions 32A in the extending direction of the pair of legs 32 are bent such that the interval between the pair of legs 32 is widened. The tip portions 32A of the pair of legs 32 are portions in which the main coil segments 22 which are separate are welded together. The bending of the tip portions 32A of the pair of legs 32 is performed after the main coil segment 22 is attached to the stator core 6. Namely, in a state before the main coil segment 22 is attached to the stator core 6, the tip portions 32A of the pair of legs 32 are parallel to each other as illustrated by alternate long and short dashes lines.

As illustrated in FIG. 6, the pair of legs 32 are inserted into a pair of the slots 12, which are located apart from each other by an interval in the circumferential direction, from one end portion 14 side in the axial direction of the stator core 6, so that the main coil segment 22 is attached to the stator core 6. In the present embodiment, the pair of legs 32 are inserted into the pair of slots 12 located apart from each other by six pitches. In this state, the bent portion 31 is disposed on the one end portion 14 side in the axial direction of the stator core 6. Incidentally, in the present specification, the pitch indicates the number of teeth 11 included between the pair of slots 12. For example, the expression that the pair of slots 12 are located apart from each other by six pitches as described above means that six teeth 11 are included between the pair of slots 12.

The pair of legs 32 are inserted into two layers LY adjacent to each other in the radial direction of the stator core 6, in the pair of slots 12 that are apart from each other by a predetermined pitch.

As illustrated in FIG. 4, the plurality of main coil segments 22 are attached to the stator core 6 to be arranged in the circumferential direction of the stator core 6 as illustrated by arrow D1 in FIG. 4, and the tip portions 32A of the legs 32 of the main coil segments 22 adjacent to each other in the circumferential direction are welded together, so that the plurality of main coil segments 22 are connected in series to form a coil.

The sub-coil segment 23 and the transition coil segment 24 are made of the same wire rod as that of the main coil segment 22. Although not illustrated, each of the sub-coil segment 23 and the transition coil segment 24 includes the same bent portion and pair of legs as those of the main coil segment 22. However, the interval between the pair of legs of the sub-coil segment 23 is smaller by one pitch than that between the main coil segments 22. In addition, the interval between the pair of legs 32 of the transition coil segment 24 is larger by one pitch than that between the main coil segments 22. The sub-coil segment 23 and the transition coil segment 24 are attached to the stator core 6 in the same manner as the main coil segment 22.

The sub-coil segment 23 and the transition coil segment 24 are connected to predetermined main coil segments 22 by welding to form the parallel coil 20 of the three-phase alternating circuit illustrated in FIG. 3, together with the plurality of main coil segments 22.

FIG. 4 illustrates a coil unit 21 forming part of the parallel coil 20. The plurality of main coil segments 22 forming the same coil unit 21 are disposed to correspond to two layers LY adjacent to each other in the slot 12 as illustrated in FIG. 8.

A plurality of the coil units 21 are arranged in the radial direction of the stator core 6 to be connected to each other to form the parallel coil 20. The parallel coil 20 of the present embodiment includes four coil units 21. For this reason, the plurality of main coil segments 22 forming the same parallel coil 20 are disposed to correspond to the eight layers LY that are arranged in the radial direction of the stator core 6 as in FIG. 8. In such a manner, the plurality of main coil segments 22 are arranged in the radial direction of the stator core 6.

As described above, the interval between the slots 12 in the circumferential direction of the stator core 6 is decreased as the slots 12 extend inward in the radial direction of the stator core 6. For this reason, as illustrated in FIGS. 9 and 10, an interval L1 between the pair of legs 32 in the main coil segment 22 corresponding to the layer LY on the inner side in the radial direction is larger than the interval L1 between the pair of legs 32 in the main coil segment 22 corresponding to the layer LY on the outer side in the radial direction. Specifically, as illustrated in FIG. 9, an interval L1A between the pair of legs 32 in a main coil segment 22A (innermost peripheral main coil segment 22A) corresponding to the innermost peripheral layer LY1 is smallest. As illustrated in FIG. 10, an interval L1B between the pair of legs 32 in a main coil segment 22B (outermost peripheral main coil segment 22B) corresponding to the outermost peripheral layer LY8 is the largest.

In addition, as illustrated in FIGS. 9 and 10, the bending angles θ of the bent portions 31 are within the predetermined range between the plurality of main coil segments 22. For this reason, a height H1 in the axial direction of the bent portion 31 in the main coil segment 22 corresponding to the layer LY on the outer side in the radial direction is larger than the height H1 of the bent portion 31 in the main coil segment 22 corresponding to the layer LY on the inner side in the radial direction. Specifically, as illustrated in FIG. 9, a height H1A of the bent portion 31 in the innermost peripheral main coil segment 22A is the smallest. As illustrated in FIG. 10, a height H1B of the bent portion 31 in the outermost peripheral main coil segment 22B is the largest.

Incidentally, in the present specification, the height may indicate a distance in the axial direction with respect to end portions of the teeth 11. For example, when the rotor shaft 4 is horizontally disposed, a rightward and leftward direction may be expressed as a height direction.

<Spacer>

As illustrated in FIGS. 2 and 6, the spacer 8 (hereinafter, also referred to as a first spacer 8) is disposed on one end portion 14 in the axial direction of the stator core 6. As illustrated in FIGS. 6 to 9, the first spacer 8 includes a coil support portion 41.

The coil support portion 41 is disposed between the end portion of the teeth 11 corresponding to the one end portion 14 of the stator core 6 in the axial direction of the stator core 6 and the bent portion 31 of the main coil segment 22.

The coil support portion 41 is formed in a shape corresponding to that of the teeth 11 when seen in the axial direction of the stator core 6. Namely, similar to the teeth 11, the coil support portion 41 is formed such that the width thereof in the circumferential direction of the stator core 6 is decreased as the coil support portion 41 extends inward in the radial direction of the stator core 6. In the present embodiment, the coil support portion 41 is disposed on the end portion of each of the teeth 11 so as not to protrude from both ends of each of the teeth 11 in the circumferential direction of the stator core 6. The width of the coil support portion 41 in the present embodiment is equal to the width of each of the teeth 11. Incidentally, for example, the width of the coil support portion 41 may be smaller than the width of each of the teeth 11.

The coil support portion 41 has a support surface 42 that supports the bent portion 31 of the main coil segment 22 in the axial direction of the stator core 6. The height position of the support surface 42 in the axial direction of the stator core 6 is low on the outer side in the radial direction of the stator core 6 and is high on the inner side in the radial direction of the stator core 6. Namely, the distance from the end portion of each of the teeth 11 to the support surface 42 on the inner side in the radial direction of the stator core 6 is longer than the distance from the end portion of each of the teeth 11 to the support surface 42 on the outer side in the radial direction of the stator core 6.

The support surface 42 of the present embodiment is formed in a step shape in the radial direction of the stator core 6. Namely, the support surface 42 has a plurality (two or more) of support regions 43 which are arranged in the radial direction of the stator core 6 and of which the height positions are discontinuously raised as the support surface 42 extend from the outer side toward the inner side in the radial direction of the stator core 6. Each of the support regions 43 is formed on a flat surface orthogonal to the axial direction of the stator core 6. A height H2A of the coil support portion 41 from the one end portion 14 of the stator core 6 to a support region 43A (innermost peripheral support region 43A) located on the innermost side in the radial direction is the largest. A height H2B of the coil support portion 41 from the one end portion 14 of the stator core 6 to a support region 43B (outermost peripheral support region 43B) of the support surface 42, the support region 43B being located on the outermost side in the radial direction is the smallest.

The support surface 42 of the present embodiment has four support regions 43. Each of the support regions 43 corresponds to two layers LY adjacent to each other in the radial direction of the stator core 6. Namely, the length of each of the support regions 43 in the radial direction of the stator core 6 corresponds to the sum of those of the two layers LY.

Accordingly, each of the support regions 43 supports the bent portions 31 of two main coil segments 22 adjacent to each other in the radial direction of the stator core 6.

As illustrated in FIG. 6, the first spacer 8 of the present embodiment includes a plurality of the coil support portions 41 described above. Further, the first spacer 8 includes a connection portion 45 that integrally connects the plurality of coil support portions 41 arranged in the circumferential direction of the stator core 6.

Specifically, the first spacer 8 includes the coil support portions 41 of which the number is the same as that of the teeth 11. The plurality of coil support portions 41 are arranged in the circumferential direction of the stator core 6 at the same intervals as those of the plurality of teeth 11. The connection portion 45 is formed in annular shape to integrally connect the plurality of coil support portions 41 arranged in such a manner.

The connection portion 45 of the present embodiment includes an inner connection portion 45A and an outer connection portion 45B. The inner connection portion 45A connects end portions of the coil support portions 41, the end portions being located on the inner side in the radial direction of the stator core 6. Meanwhile, the outer connection portion 45B connects end portions of the coil support portions 41, the end portions being located on the outer side in the radial direction of the stator core 6. Incidentally, for example, the connection portion 45 may include only one of the inner connection portion 45A and the outer connection portion 45B.

The first spacer 8 of the present embodiment configured as described above has electrical insulating properties. The first spacer 8 may be made of, for example, a resin material.

As illustrated in FIG. 1, the stator 3 of the present embodiment further includes a spacer 9 (hereinafter, referred to as a second spacer 9) that is disposed on the other end portion 16 in the axial direction of the stator core 6. Although not illustrated, similar to the first spacer 8, the second spacer 9 includes a plurality of coil support portions that are disposed on end portions of the plurality of teeth 11, the end portions corresponding to the other end portion 16 of the stator core 6 in the axial direction of the stator core 6. In addition, similar to the first spacer 8, the second spacer 9 includes a connection portion that integrally connects the plurality of coil support portions.

The coil support portion of the second spacer 9 has a support surface that supports the tip portion 32A (refer to FIG. 5) of the leg 32 of the main coil segment 22, the tip portions 32A protruding from the other end portion 16 side of the stator core 6. However, in the second spacer 9, the height position of the support surface of the coil support portion in the axial direction of the stator core 6 is not changed or is substantially not changed in the radial direction of the stator core 6. Namely, the second spacer 9 is formed in a flat plate shape having the axial direction of the stator core 6 as a thickness direction.

<Effects>

When the stator 3 of the present embodiment is produced, as illustrated in FIG. 6, first, the first spacer 8 is disposed on the one end portion 14 of the stator core 6. Next, the pair of legs 32 of each of the main coil segments 22 are inserted into the pair of slots 12, which correspond to the pair of legs 32, from the one end portion 14 side of the stator core 6. In the present embodiment, in a state where the one end portion 14 of the stator core 6 faces upward in a vertical direction, the legs 32 of the main coil segment 22 are inserted into the slots 12. Incidentally, although not illustrated, the legs of the sub-coil segment 23 or the transition coil segment 24 are also inserted into the slots 12 in the same manner.

In this state, as illustrated in FIGS. 8 to 10, the bent portion 31 of each of the main coil segments 22 is supported by the support surface 42 of the coil support portion 41.

Specifically, both end portions of the bent portions 31, both the end portions being located in the vicinity of the pair of legs 32, are supported by the edges of the support surface 42 in the circumferential direction of the stator core 6. For example, the bent portion 31 of the innermost peripheral main coil segment 22A is supported by the innermost peripheral support region 43A of the support surface 42. The bent portion 31 of the outermost peripheral main coil segment 22B is supported by the outermost peripheral support region 43B of the support surface 42.

Since the bent portion 31 is supported by the support surface 42 of the coil support portion 41 in such a manner, a height HT in the axial direction from the one end portion 14 of the stator core 6 to the top 33 of the bent portion 31 is the sum of a height H2 of the coil support portion 41 from the one end portion 14 of the stator core 6 to the support surface 42 and the height H1 of the bent portion 31 from the support surface 42 to the top 33 of the bent portion 31.

Here, the height H1 of the bent portion 31 in the main coil segment 22 corresponding to the layer LY on the outer side in the radial direction is larger than the height H1 of the bent portion 31 in the main coil segment 22 corresponding to the layer LY on the inner side in the radial direction. However, the height position of the support surface 42 is low on the outer side in the radial direction of the stator core 6 and is high on the inner side in the radial direction of the stator core 6. For this reason, the difference in height HT from the one end portion 14 of the stator core 6 to the top 33 of the bent portion 31 between the main coil segment 22 corresponding to the layer LY on the outer side in the radial direction and the main coil segment 22 corresponding to the layer LY on the inner side in the radial direction can be reduced, or the difference in height HT can be eliminated. Namely, the heights HT from the one end portion 14 of the stator core 6 to the tops 33 of the bent portions 31 can be made uniform between the plurality of main coil segments 22 arranged in the radial direction.

After the legs 32 of the plurality of main coil segments 22 are inserted into the slots 12, the tip portions 32A of the legs 32 are bent as illustrated in FIG. 5. After the tip portions 32A are bent, the tip portion 32A of the leg 32 of the main coil segment 22 and the tip portion 32A of the leg 32 of another main coil segment 22, which protrude from the other end portion 16 of the stator core 6, are welded together. At this time, the tops 33 of the bent portions 31 which protrude from the one end portion 14 of the stator core 6 are pressed toward the one end portions 14 of the stator core 6. Specifically, after the stator core 6 is turned upside down such that the other end portion 16 of the stator core 6 faces upward in the vertical direction, the stator core 6 is placed on a flat placement surface J1 of a jig J, the flat placement surface J1 facing upward in the vertical direction, and the tops 33 of the bent portions 31 are pressed toward the one end portion 14 of the stator core 6.

Here, the heights HT from the one end portion 14 of the stator core 6 to the tops 33 of the bent portions 31 are uniform between the plurality of main coil segments 22 arranged in the radial direction. In addition, the bent portions 31 of the main coil segments 22 are supported by the support surfaces 42 of the first spacer 8, and the first spacer 8 is supported by the one end portion 14 of the stator core 6. For this reason, the main coil segments 22 are fixed between the placement surface J1 of the Jig J and the support portions of the first spacer 8. Accordingly, when the main coil segments 22 are bent, when welding is performed, or when both of bending and welding are performed, the movement of the main coil segments 22 in the axial direction, which leads to an imbalance in height between the legs 32 to be welded together, can be prevented.

As described above, the stator 3 and the rotary electric machine 1 including the same according to the present embodiment include the first spacer 8 in which the height position of the support surface 42 of the coil support portion 41 is low on the outer side in the radial direction of the stator core 6 and is high on the inner side in the radial direction of the stator core 6. Accordingly, even when the bending angles θ of the bent portions 31 are within the predetermined range between the plurality of main coil segments 22, the heights HT from the one end portion 14 of the stator core 6 to the tops 33 of the bent portions 31 can be made uniform between the plurality of main coil segments 22 arranged in the radial direction.

In addition, according to the stator 3 and the rotary electric machine 1 according to the present embodiment, the support surface 42 of the coil support portion 41 is formed in a step shape in the radial direction of the stator core 6, and each of the support regions 43 of the support surface 42 is formed on a flat surface orthogonal to the axial direction of the stator core 6. For this reason, the bent portion 31 of the main coil segment 22 can be in line contact with the support surface 42 (support region 43). Therefore, the bent portion 31 of the main coil segment 22 can be stably supported by the coil support portion 41.

In addition, according to the stator 3 and the rotary electric machine 1 according to the present embodiment, the first spacer 8 includes the connection portion 45 that integrally connects the plurality of coil support portions 41 arranged in the circumferential direction of the stator core 6. For this reason, the plurality of coil support portions 41 can be simultaneously disposed on the end portions of the plurality of teeth 11 simply by disposing one first spacer 8 on the one end portion 14 of the stator core 6. In particular, the connection portion 45 of the present embodiment is formed in an annular shape to integrally connect the coil support portions 41 of which the number is the same as that of the teeth 11. For this reason, all the coil support portions 41 can be simultaneously disposed on the end portions of all the teeth 11 simply by disposing one first spacer 8 on the one end portion 14 of the stator core 6. Therefore, the production efficiency of the stator 3 including the first spacer 8 can be improved.

In addition, according to the stator 3 and the rotary electric machine 1 according to the present embodiment, since the first spacer 8 has electrical insulating properties, insulation between the stator 3 and the coil 7 can be secured, and the durability and reliability of the stator 3 can be improved.

Other Embodiments

The embodiment of the present invention has been described above; however, the present invention is not limited thereto, and modifications can be appropriately made without departing from the technical concept of the invention.

Figure 11:
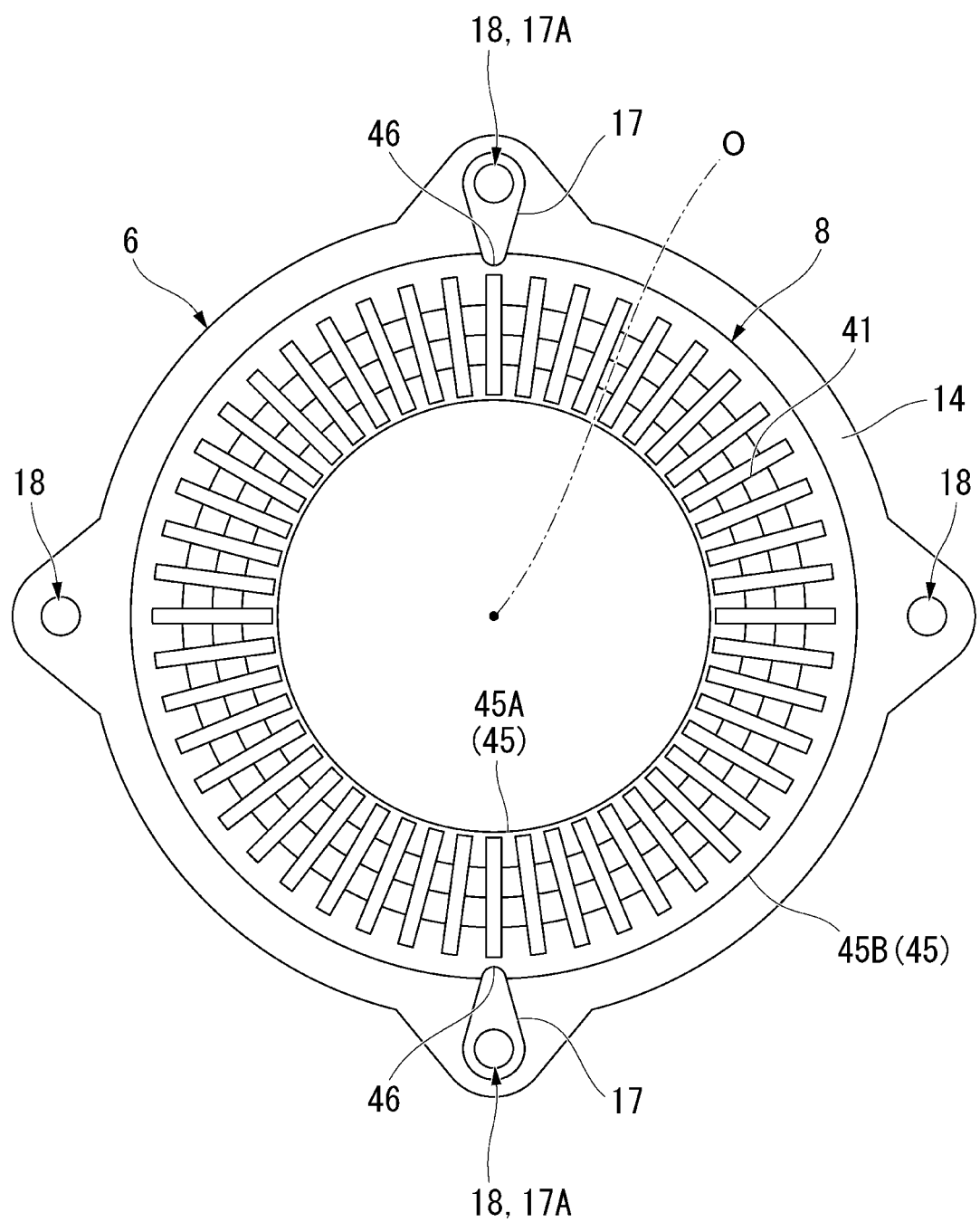
FIG. 11 is a plan view illustrating a stator core and a spacer of a stator according to another embodiment of the present invention.

In the stator of the present invention, when the spacer 8 is formed in an annular shape as in the embodiment, for example, as illustrated in FIG. 11, a cutout 46 is formed in part in the circumferential direction of the spacer 8. The cutout 46 is recessed inward in the radial direction from an outer peripheral edge of the outer connection portion 45B. The number of the cutouts 46 formed in the spacer 8 may be one or more. A plurality of the cutouts 46 may be arranged at intervals in the circumferential direction of the spacer 8. In the configuration illustrated in FIG. 11 as an example, two cutouts 46 are arranged at equal intervals in the circumferential direction of the spacer 8.

Meanwhile, a locking portion 17 to be inserted into the cutout 46 of the spacer 8 is provided in the one end portion 14 of the stator core 6. In the configuration illustrated in FIG. 11 as an example, the locking portion 17 is formed separately from the stator core 6, and is detachably fixed to the stator core 6. Incidentally, for example, the locking portion 17 may be integrally formed with the stator core 6.

In the configuration illustrated in FIG. 11 as an example, when the spacer 8 is disposed on the one end portion 14 of the stator core 6 in a state where the locking portions 17 are fixed to the stator core 6, the locking portions 17 are inserted into the cutout 46 of the spacer 8, so that the spacer 8 can be suppressed or prevented being misaligned with respect to the stator core 6 in the circumferential direction. Namely, the coil support portions 41 of the spacer 8 can be suppressed or prevented from misaligned with respect to the teeth 11 in the circumferential direction of the stator core 6. Therefore, the spacer 8 can be easily positioned with respect to the stator core 6, and the production efficiency of the stator can be improved.

Incidentally, after the spacer 8 is disposed on the one end portion 14 of the stator core 6 and the main coil segments 22 are attached to the stator core 6, the locking portions 17 may be removed from the stator core 6.

Figure 12:
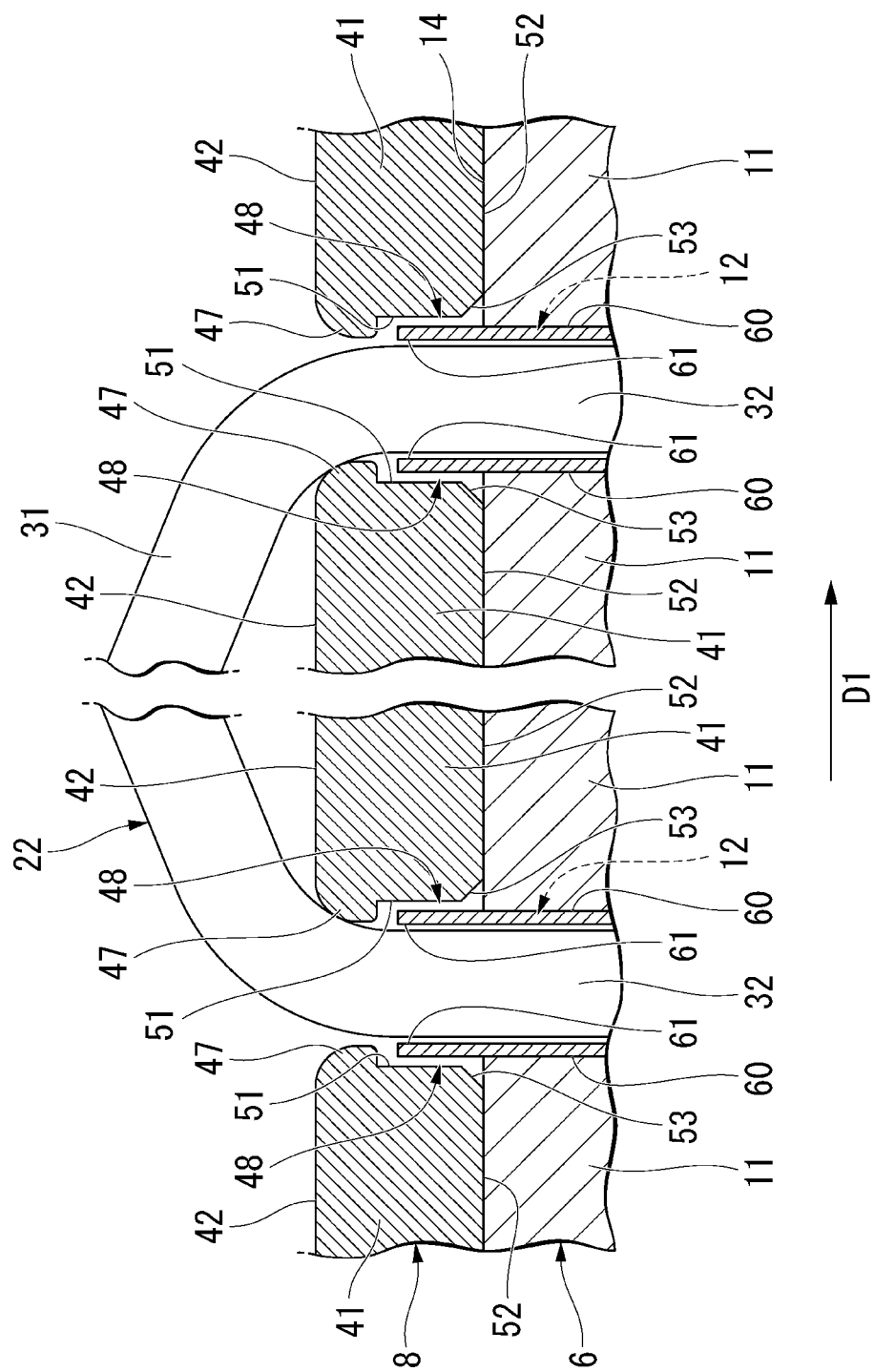
FIG. 12 is a cross-sectional view illustrating a main part of a stator according to another embodiment of the present invention.

In the stator of the present invention, for example, as illustrated in FIG. 12, corners between the support surfaces 42 located at both ends of the coil support portion 41 in the circumferential direction of the stator core 6 and side surfaces of the coil support portion 41 may be formed in curved surfaces having an arc shape which smoothly connects the support surfaces 42 and the side surfaces of the coil support portion 41. Incidentally, the side surface of the coil support portion 41 is a surface facing the circumferential direction of the stator core 6.

Since the curved surface is formed between the support surface 42 and the side surface of the coil support portion 41, even when the main coil segment 22 comes into contact with the corner between the support surface 42 and the side surface of the coil support portion 41, the insulating coating of the main coil segment 22 can be prevented from being damaged.

In the stator of the present invention, for example, as illustrated in FIG. 12, the coil support portion 41 of the spacer 8 includes protrusion portions 47 that protrude from both ends of each of the teeth 11 in the circumferential direction of the stator core 6. Namely, for example, the width of the coil support portion 41 may be larger than the width of each of the teeth 11.

In the configuration illustrated in FIG. 12 as an example, the protrusion portion 47 is located close to a portion on a support surface 42 side of the coil support portion 41 in the axial direction of the stator core 6. In addition, recess portions 48 which are recessed inward from both the ends of each of the teeth 11 in the circumferential direction of the stator core 6 are formed in portions of the coil support portion 41, the portions being located closer to the one end portion 14 side of the stator core 6 in the axial direction of the stator core 6 than the protrusion portions 47. Incidentally, the protrusion portion 47 may not be formed and the recess portion 48 may be formed in the coil support portion 41. Alternatively, the recess portion 48 may not be formed and the protrusion portion 47 may be formed in the coil support portion 41.

Further, a corner between a side surface 51 of the recess portion 48 of the coil support portion 41 extending in the axial direction of the stator core 6 and a facing surface 52 of the coil support portion 41 facing the one end portion 14 of the stator core 6 is chamfered. Namely, an inclined surface 53 which is inclined with respect to both the side surface 51 of the recess portion 48 and the facing surface 52 of the coil support portion 41 is formed between the side surface 51 of the recess portion 48 and the facing surface 52 of the coil support portion 41. Incidentally, the side surface 51 of the recess portion 48 is a surface facing the circumferential direction of the stator core 6. In addition, the facing surface 52 of the coil support portion 41 is a flat surface that is located adjacent to a stator core 6 side with respect to the side surface 51 of the recess portion 48 in the axial direction of the stator core 6 and is orthogonal to the axial direction of the stator core 6 or the side surface 51 of the recess portion 48. Since the inclined surface 53 is a flat surface, the inclined surface 53 is inclined with respect to the side surface 51 of the recess portion 48 and the facing surface 52 of the coil support portion 41 at an angle smaller than 90 degrees.

The corner between the side surface 51 of the recess portion 48 and the facing surface 52 of the coil support portion 41 may be formed, for example, as a curved surface having an arc shape which smoothly connects the side surface 51 of the recess portion 48 and the facing surface 52 of the coil support portion 41.

In the case where the coil support portion 41 includes the protrusion portion 47, a slot insulating paper 60 which is inserted into the slot 12 to be interposed between the leg 32 of the main coil segment 22 and each of the teeth 11 can be supported in the axial direction of the stator core 6 by the protrusion portion 47 of the coil support portion 41. Accordingly, the slot insulating paper 60 can be suppressed from being misaligned with respect to the stator core 6 in the axial direction thereof.

In addition, in the case where the recess portion 48 is formed in the coil support portion 41, a protrusion portion 61 of the slot insulating paper 60 protruding from the one end portion 14 of the stator core 6 can be accommodated in the recess portion 48.

In addition, in the case where the inclined surface 53 or a curved surface is formed between the side surface 51 of the recess portion 48 and the facing surface 52 of the coil support portion 41, when the spacer 8 is disposed on the one end portion 14 of the stator core 6, the protrusion portion 61 of the slot insulating paper 60 can easily enter the recess portion 48.

Specifically, in order to produce the stator, after the slot insulating paper 60 is inserted into the slot 12 of the stator core 6, the spacer 8 is disposed on the one end portion 14 of the stator core 6. At this time, the protrusion portion 61 of the slot insulating paper 60 is guided toward the inside of the recess portion 48 by the inclined surface 53 or the curved surface between the side surface 51 of the recess portion 48 and the facing surface 52 of the coil support portion 41. Accordingly, the protrusion portion 61 of the slot insulating paper 60 can easily enter the recess portion 48. Therefore, the stator can be easily produced.

Incidentally, in a case where the inclined surface 53 or the curved surface is not formed between the side surface 51 of the recess portion 48 and the facing surface 52 of the coil support portion 41, since the protrusion portion 61 of the slot insulating paper 60 is likely to strike against the facing surface 52 of the coil support portion 41, the protrusion portion 61 of the slot insulating paper 60 has difficulties in entering the recess portion 48. In addition, when the protrusion portion 61 of the slot insulating paper 60 strikes against the facing surface 52 of the coil support portion 41, there is also a possibility that the protrusion portion 61 of the slot insulating paper 60 is bent to be interposed between the stator core 6 and the spacer 8. In this case, the spacer 8 is partially lifted with respect to the stator core 6, and part of the main coil segment 22, the part being supported by the spacer 8 partially lifted, moves in the axial direction. For this reason, there occurs an imbalance in height between the legs 32 to be welded together. As a result, it is preferable that the inclined surface or the curved surface is formed between the side surface 51 of the recess portion 48 and the facing surface 52 of the coil support portion 41.

The spacer of the present invention may include, for example, only one coil support portion 41.

Figure 13:
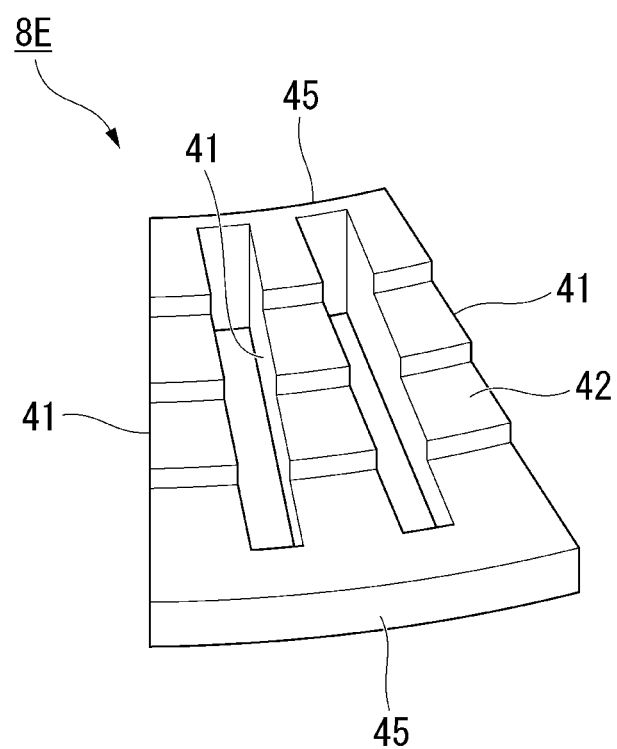
FIG. 13 is a perspective view illustrating a spacer provided in a stator according to another embodiment of the present invention.

In addition, in the present invention, for example, as illustrated in FIG. 13, a spacer 8E may include a plurality of the coil support portions 41, the number of which is smaller than the number of the teeth 11. In the spacer 8E illustrated in FIG. 13 as an example, similar to the embodiment, the plurality of coil support portions 41 are arranged in the circumferential direction of the stator core 6 at the same intervals as those of the plurality of teeth 11. In this case, the connection portion 45 may be formed in an arc shape forming part of an annular shape.

In the spacer 8E having such a configuration, the number of the coil support portions 41 may be a random number, and may be a divisor of the number of the teeth 11. For example, when the number of the teeth 11 is 48, the number of the coil support portions 41 may be 2, 3, 4, 6, 8, 12, 16, or 24. In the illustrated example, the number of the coil support portions 41 is 3. When the number of the coil support portions 41 is a divisor of the number of the teeth 11, the coil support portions 41 can be disposed on the end portions of all the teeth 11 only by using the spacer 8E of one type including a predetermined number of the coil support portions 41.

Figure 14:
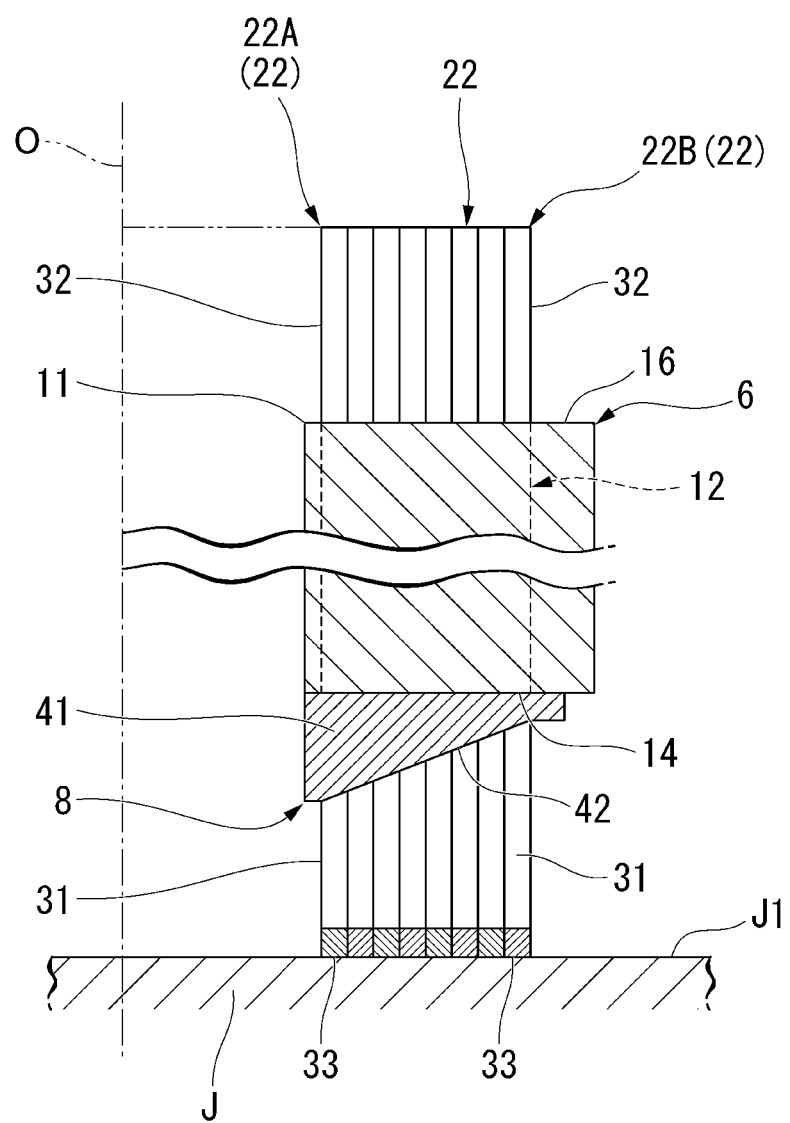
FIG. 14 is a cross-sectional view schematically illustrating a stator according to another embodiment of the present invention.

In the present invention, for example, as illustrated in FIG. 14, the support surface 42 of the coil support portion 41 may be an inclined surface which is inclined with respect to the axial direction of the stator core 6 such that the height position of the inclined surface is continuously raised as the inclined surface extends from the outer side in the radial direction of the stator core 6 toward the inner side. Even when the support surface 42 is an inclined surface, the same effects as those of the embodiment can be obtained. However, when the support surface 42 is an inclined surface, the bent portion 31 is in point contact with the support surface 42. Therefore, it is more preferable that the support surface 42 is formed in a step shape.

The rotary electric machine of the present invention is not limited to a motor that causes an alternating current to flow through the coils 7 of the stator 3 to drive the rotor 2 to rotate, and may be a generator that generates electric power when the rotor 2 is rotated by power of an engine or the like.

In the stator of the present invention, the number of the insertion regions LY may be a number other than 8. The present invention can be also applied to a stator having, for example, four, six, ten, twelve or more insertion regions LY.

The rotary electric machine of the present invention is suitable as a rotary electric machine used in work vehicles such as a hydraulic excavator, a bulldozer, and a forklift.

INDUSTRIAL APPLICABILITY

According to the present invention, even when the bending angles of the bent portions of the plurality of coil segments are within a predetermined range, a variation between the axial heights of the legs to be welded together can be suppressed.

The invention claimed is:

1. A stator comprising:
a stator core including a plurality of teeth and a plurality of slots that are alternately formed in a circumferential direction;
a coil wound around the plurality of slots; and
a spacer disposed on an end portion in an axial direction of the stator core,
wherein the coil includes a plurality of coil segments, each including a bent portion bent at a predetermined angle and a pair of legs that extend parallel to each other from both ends of the bent portion to be inserted into the slots,
the spacer includes a coil support portion that is disposed between an end portion of each of the teeth and the bent portion of the coil segment in the axial direction and that has a support surface which supports the bent portion in the axial direction, and
a distance from the end portion of each of the teeth to the support surface on an inner side in a radial direction of the stator core is longer than a distance from the end portion of each of the teeth to the support surface on an outer side in the radial direction of the stator core.

2. The stator according to claim 1,
wherein the support surface is formed in a step shape in the radial direction of the stator core.

3. The stator according to claim 1,
wherein the spacer includes a connection portion that integrally connects a plurality of the coil support portions arranged in the circumferential direction.

4. The stator according to claim 3,
wherein the connection portion is formed in an annular shape.

5. The stator according to claim 1,
wherein the coil support portion includes protrusion portions that protrude from both ends of each of the teeth in the circumferential direction.

6. The stator according to claim 1,
wherein the coil segment is made of a rectangular wire.

7. The stator according to claim 1,
wherein recess portions which are recessed inward from both ends of each of the teeth in the circumferential direction of the stator core are formed in at least portions of the coil support portion, the portions being located on an end portion side in the axial direction of the stator core, and
an inclined surface which is inclined with respect to both a side surface of the coil support portion and a facing surface of the coil support portion is formed between a side surface of the recess portion extending in the axial direction of the stator core and the facing surface of the coil support portion, the facing surface facing the end portion in the axial direction of the stator core.

8. A rotary electric machine comprising:
a rotor; and
the stator according to claim 1, the stator accommodating the rotor.

* * * * *